Dec. 24, 1968  P. E. ROLFES  3,418,559
APPARATUS AND METHOD FOR GATING THE SCR'S IN
AN INVERTER, AND STANDBY POWER-SUPPLY
AND BATTERY-CHARGING SYSTEM
INCORPORATING THE SAME
Filed March 11, 1964  3 Sheets-Sheet 3

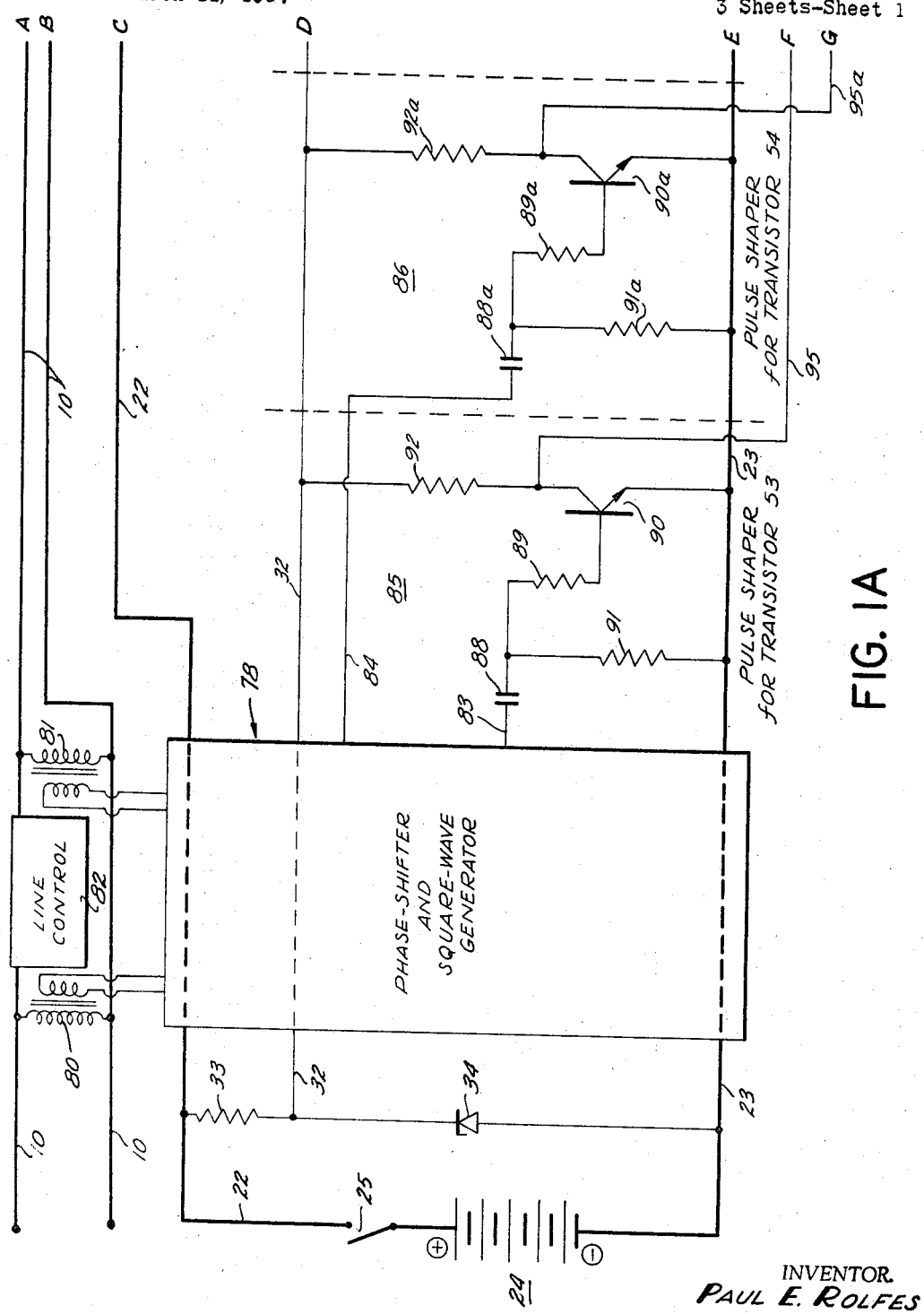
FIG. IA
INVENTOR.
PAUL E. ROLFES
BY
ATTORNEYS

INVENTOR.
PAUL E. ROLFES
BY
ATTORNEYS

United States Patent Office 3,418,559
Patented Dec. 24, 1968

3,418,559
APPARATUS AND METHOD FOR GATING THE SCR'S IN AN INVERTER, AND STANDBY POWER-SUPPLY AND BATTERY-CHARGING SYSTEM INCORPORATING THE SAME
Paul E. Rolfes, Costa Mesa, Calif., assignor, by mesne assignments, to Lorain Products Corporation, Lorain, Ohio, a corporation of Ohio
Filed Mar. 11, 1964, Ser. No. 351,045
13 Claims. (Cl. 321—45)

ABSTRACT OF THE DISCLOSURE

This disclosure relates to a gate-driver circuit (and method) for the gates of an SCR inverter wherein a reactive current is flowing. The circuit effects triggering of each SCR once during each half-cycle of inverter operation, but prevents triggering of an SCR a second time during any half-cycle of inverter operation. The inverter and gate-driver circuits are incorporated in a standby power-supply system for an A.C. power line, such system having means to shift the phase of the inverter voltage wave relative to the line voltage wave in order to charge the battery from the line without disconnecting the inverter therefrom.

---

This invention relates to a method and apparatus for supplying gate signals to the SCR's in the inverter portion of a standby power-supply and battery-charging system. The invention also relates to the entire system, and to a method and apparatus for gating SCR's in other systems incorporating inverters or the like.

In co-pending patent application Ser. No. 337,621, filed Jan. 14, 1964, for a Continuously-Operating Standby Power-Supply and Battery-Charging Apparatus and Method, inventor Robert S. Jamieson, there is described and claimed a standby system in which the battery is charged in a controllable manner without at any time rendering the system inoperative to supply energy to a load in the event of line power failure. The system described in such patent application will operate successfully under various types of load and power conditions. However, when operating under certain other load and power conditions the system described in said application, although operable, is not commercially satisfactory. For example, at relatively high power levels the apparatus described in said patent application may effect excessive heating of the commutating capacitor, and excessive heating and consequent out-gassing of the storage battery. Such heating and gassing waste substantial amounts of electrical power, and may result in destruction of the battery, commutating capacitor and other components. The present invention renders the apparatus and method described in the above-indicated patent application practical under all conditions of power and load, there being negligible heating of the commutating capacitor, battery and other components. This important result is achieved by effecting elimination of undesirable circulating currents, but without diminishing the output of effectiveness of the system. For example, the present invention eliminates many higher-frequency components of the circulating currents, to thus reduce to a minimum the amount of heating of the battery.

To appreciate fully the advantages achieved by the present invention, it is necessary to understand the behavior of a storage battery through which high-frequency currents are being circulated. Although a battery is frequently referred to as the equivalent of a very large capacitor having a low internal series resistance, this is only true relative to slowly-varying currents. When the circulating currents have high frequencies, the battery acts as a high impedance, the result being that excessive internal heating occurs.

Current is conducted through a storage battery by means of the flow of ions between the battery plates, the negative ions migrating in one direction and the positive ions in the opposite direction. For example, when the electrolyte is sulfuric acid there will be two ions of hydrogen migrating in one direction, and one ion of sulfate migrating in the opposite direction. Such ions must pass through the water which is employed to dilute the sulfuric acid. As each ion migrates toward its respective battery plate, it undergoes a certain amount of collisions with water molecules, which collisions impede the ion progress. Furthermore, it is believed that each ion attracts a cloud of water molecules as it travels, such cloud being termed an "ion atmosphere." Because of the presence of such atmosphere, the profile of the traveling aggregate is large in comparison to that of the ion itself, thus enhancing the ability to collide and further retarding the progress of the ion.

When a potential difference is applied to the plates of the battery, the current cannot instantly respond because of the time required for the ions to migrate to the battery plates. In the immediate vicinity of each plate there may exist only a few percent of the available ions. Thus, during the instant immediately following the creation of the potential difference, only a very few ions will reach the battery plates—the result being that the impedance of the battery becomes much higher under high-frequency conditions than under low-frequency conditions. For example, only a one-volt drop may exist across a 48-volt battery through which a one hundred ampere steady-state direct current is flowing, whereas a thirty-volt drop may exist across the battery through which a one hundred ampere pulse is flowing. It is to be understood that the above theory applies both during charging and discharging of the battery. Thus, as emphasized above, a direct current or low-frequency current flow in either direction through a storage battery will effect much less heating than will a high-frequency current flow, for example in the form of spikes or pulses.

In view of the above, it is a primary object of the present invention to provide a standby power-supply and battery-charging apparatus and method in which circulating currents, particularly high-frequency circulating currents, are reduced to such a low value that the battery, commutating capacitor, and other components of the system do not heat excessively and therefore have an extremely long life.

Another object of the present invention is to provide a method and apparatus for gating the SCR's in an inverter or the like, in such manner as to reduce circulating currents at no-load and under certain other load conditions, but without reducing the output of the inverter.

Another object is to provide a method and apparatus for charging a battery without effecting substantial heating thereof.

These and other objects will become apparent from the following detailed description taken in connection with the accompanying drawings in which:

FIGURES 1A and 1B combine to form a single circuit diagram illustrating schematically one embodiment of the present invention, said figures being correlated to each other by means of the letters A–G, inclusive;

Figure 7:
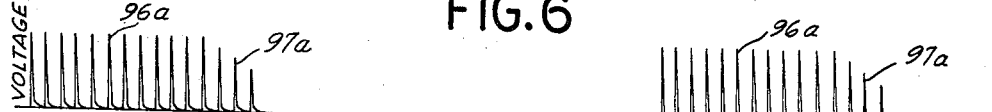
Figure 8:
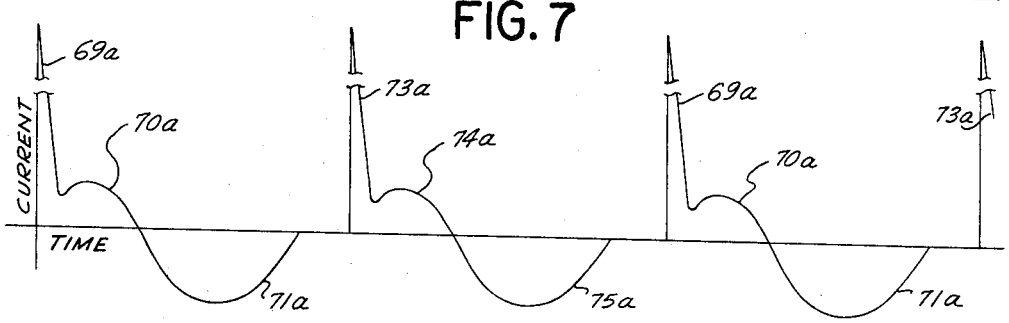

FIGURE 7 is a view illustrating the gate signal which is supplied to the gate of a particular SCR in the inverter, due to the operation of the associated pulse-shaping network, high-frequency oscillator and gate modulator; and FIGURE 8 is a diagram showing a typical current wave through the battery in the present circuit, and in response to application to the inverter SCR's of gate signals such as are illustrated in FIGURE 7.

Reference is hereby made not only to the above-cited patent application but also to a second co-pending application, namely application Ser. No. 338,748, filed Jan. 20, 1964, for an Apparatus and Method for Starting, Operating and Stopping an Inverter, inventor Robert S. Jamieson. The system described in said patent applications is adapted to supply standby power to a conventional 60-cycle A.C. power line which is indicated at 10 across the upper portion of FIGURES 1A and 1B. The present invention may also be incorporated in an inverter system which is not part of a standby power supply, in order to minimize circulating currents and consequent losses under various conditions.

Figure 1B:
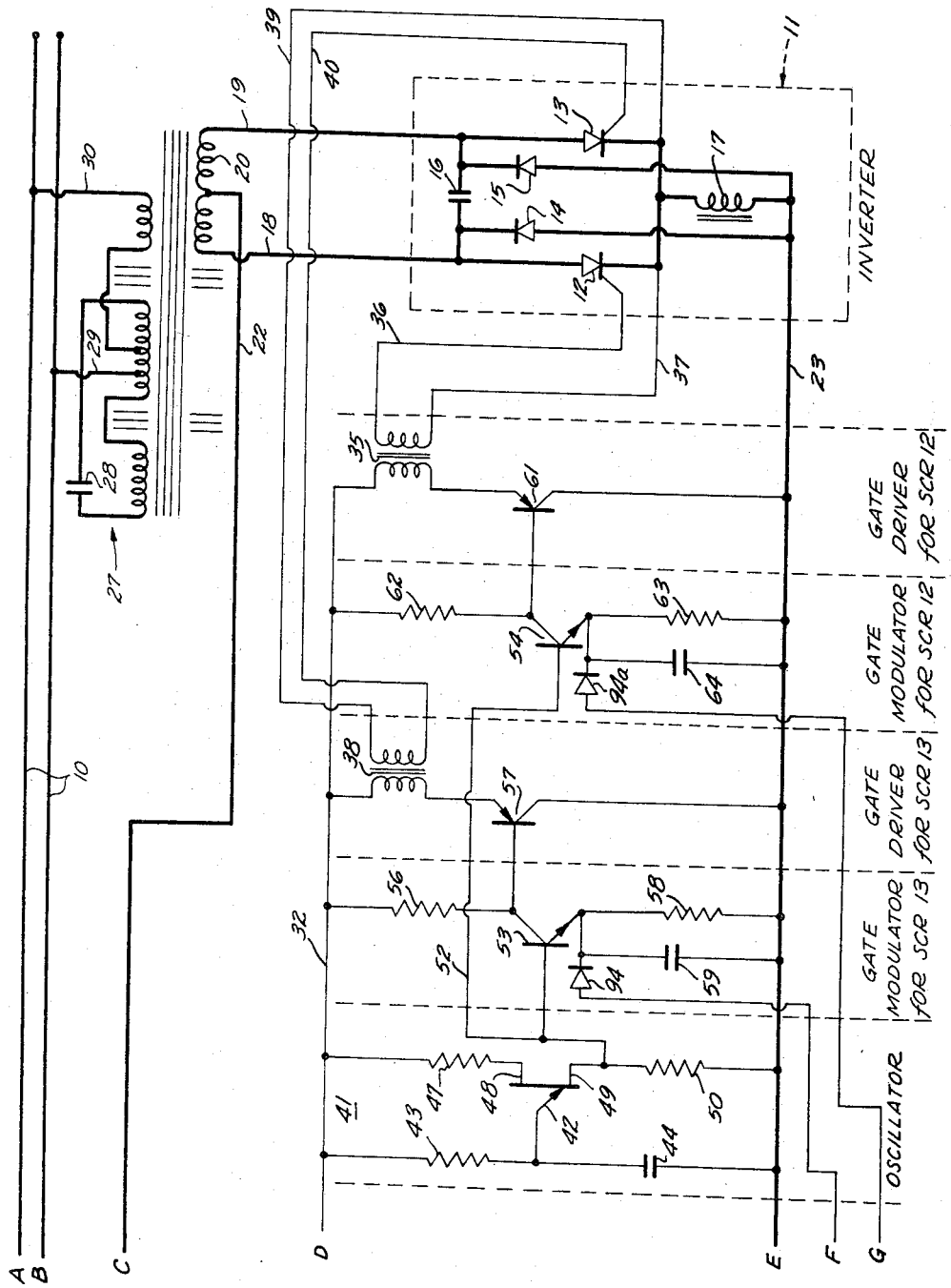

The present apparatus and method may best be understood by referring first to FIGURE 1B, which corresponds generally to FIGURE 1B of the above-cited application Ser. No. 338,748. After the circuitry illustrated primarily in FIGURE 1B is described, a description will be given concerning the result which would occur if the gating method described in such application Ser. No. 338,748 were employed. A description of the most critical features of the present invention will then be given, followed by a description of the preferred circuitry which is employed, in combination with the circuitry of FIGURE 1B, to achieve the benefits of the present invention.

Referring first to the inverter 11, which is shown at the right side of FIGURE 1B, this is illustrated to comprise a conventional parallel square-wave SCR inverter. Such an inverter is described on p. 152 et seq. of the General Electric SCR Manual, Second Edition, and incorporates two SCR's 12 and 13 which are reverse oriented relative to clamping, reactance or feedback diodes 14 and 15. The inverter also incorporates a commutating capacitor 16 and an inductor or choke 17.

The output leads 18 and 19 from inverter 11 extend from the anodes of the SCR's, and the cathodes of the diodes, to opposite end terminals of a transformer primary 20. The input to the inverter comprises leads 22 and 23 the former of which is connected to a center tap on transformer primary 20, and the latter of which is connected to choke 17 and to the anodes of diodes 14 and 15 (the cathodes of the SCR's being connected to the other side of the choke). Lead 22 extends to the positive terminal of a storage battery 24, and has interposed therein a switch 25 (normally a circuit breaker responsive to overload conditions). Lead 23 is the negative or ground lead which extends from the inverter to the negative battery terminal.

When the load on the inverter is sufficiently reactive, the inverter 11 and battery 24 cooperate to effect flow of alternating current through the battery leads. Such battery current flows in a generally clockwise direction through the lead 22, the SCR's 12 and 13 in inverter 11, and lead 23 back to the battery. The battery current then flows in a generally counterclockwise direction through lead 23, the diodes 14 and 15 in inverter 11, and lead 22 back to the battery. The current flow is not in parallel, but is in alternation through one SCR or the other, or one diode or the other.

The transformer primary 20 forms part of a coupling means which comprises a ferroresonant transformer 27 or any equivalent thereof. The indicated ferroresonant transformer is a harmonic-suppressing regulating transformer of the general type referred to on p. 165 of the General Electric SCR Manual, second edition, and described in United States Patents No. 2,143,745 and No. 2,694,177. The described transformer includes a capacitor 28 connected between end terminals of two of the secondary windings. The capacitor forms part of a resonant or tank circuit in the output portion of the transformer, the output being through leads 29 and 30 which are connected, respectively, to opposite sides of line 10.

In addition to the indicated positive power lead 22, the indicated circuit may include what may be termed a positive control lead 32 which is at a voltage substantially lower than that of power lead 22. Such positive control lead 32 is connected to a voltage-reducing and stabilizing circuit which is series connected between leads 22 and 23, comprising a resistor 33 and Zener diode 34. The Zener 34, which is connected between the leads 32 and 23 whereas resistor 33 is connected between leads 22 and 32, has a breakdown voltage lower than the battery voltage, for example 25 volts where the battery voltage is 52 volts.

Proceeding next to a description of a portion (shown in FIGURE 1B) of the preferred circuitry for driving the gates of SCR's 12 and 13, the gate of SCR 12 is supplied with signal from the secondary of a pulse transformer 35 (via leads 36 and 37), whereas the gate of SCR 13 is supplied with signal from the secondary of a second pulse transformer 38 (via leads 39 and 40). Such pulse transformers 35 and 38 form components of gate driver circuits to be described hereinafter.

As described in detail in application Ser. No. 338,748, the indicated pulse transformers 35 and 38 each pass a train of high-frequency pulses. Each of such pulses has a duration sufficiently long to effect triggering of one of the SCR's, and has a voltage sufficiently high to effect such triggering. It is to be understood, however, that the invention described in the present patent application is also applicable to gate signals which are not formed by high-frequency pulse trains. For example, the gate signals may comprise portions of square waves. In the latter event, the small pulse transformers 35 and 38 may be replaced by relatively large transformers adapted to pass square waves.

The indicated pulse trains, which are preferably employed as described in said application Ser. No. 338,748, are generated by a high-frequency oscillator 41. Such oscillator is illustrated as comprising a unijunction transistor relaxation oscillator. In the indicated oscillator, the emitter 42 of the unijunction transistor is connected to the junction between a resistor 43 and a capacitor 44, the latter being connected to negative lead 23 whereas the former is connected to positive lead 32. A second resistor 47 is connected between base-two 48 of the unijunction tranlator is illustrated as comprising a unijunction transistor sistor is connected through a resistor 50 to ground or negative lead 23.

The voltage delivered to capacitor 44, through lead 32 and the resistor 43, builds up rapidly to the value required to fire the unijunction and cause discharge of capacitor 44 through emitter 42, base-one 49 and resistor 50. Each such firing causes a voltage pulse to be delivered through an output lead 52 to the bases of two NPN transistors 53 and 54. Transistor 53 forms part of a gate modulator circuit for the gate driver circuit including pulse transformer 38. Correspondingly, transistor 54 forms part of the gate modulator circuit for the gate driver incorporating pulse transformer 35. Capacitor 44 and other components of the oscillator 41 have values selected to produce a relatively high frequency, as described in said application Ser. No. 338,748.

The high-frequency pulse train generated by oscillator 41 is modulated in a particular manner. This may be accomplished, as will be described in detail below, by cutting off the transistors 53 and 54 in alternation, and during predetermined time intervals. Stated otherwise, the modulation may be effected by maintaining the transistors 53 and 54 cut off at all times except during predetermined time intervals.

The collector of the transistor 53, in the gate modulator for SCR 13, is connected through a resistor 56 to positive control lead 32. Such collector is also connected to the base of a transistor 57 which forms part of the gate driver circuit for SCR 13. The emitter of transistor 53 is connected to negative lead 23 through the parallel combination of a resistor 58 and capacitor 59, the latter having a magnitude selected to bypass the frequency of the oscillator 41 and thereby prevent emitter degeneration.

The emitter of transistor 57, in the gate driver circuit for SCR 13, is connected to one terminal of the primary of pulse transformer 38, the other terminal of such primary being connected to positive control lead 32. The collector of transistor 57 is connected to ground lead 23. Thus, it will be understood that the transistor 57, which is a suitable PNP transistor, is connected in emitter-follower relationship relative to transistor 53, and therefore serves to lower the output impedance of such transistor 53, and to produce current (power) gain.

Figure 6:
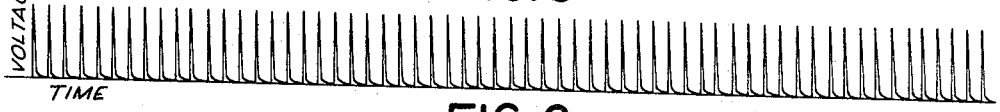
FIGURE 6 is a view illustrating the pulse train generated by the high-frequency oscillator, it being understood that FIGURE 6 is greatly exaggerated (expanded) in order to illustrate the shapes of typical pulses.

When transistor 53 is in conduction, it passes and amplifies the positive pulse train delivered thereto through lead 52 from the high-frequency oscillator 41. The amplified pulse train is fed to the emitter-follower stage including transistor 57, and appears at the primary of pulse transformer 38. Thus, if there were no modulation, the pulse train would be delivered continuously through leads 39 and 40 to the gate of SCR 13. However, as indicated above, the pulse train is modulated in such manner that portions of the high-frequency pulse train are delivered intermittently to SCR 13, in a desired relationship relative to the pulse train portions delivered intermittently to SCR 12. Reference is made to FIGURE 6, which shows (in expanded manner, as previously noted) the original pulse train, and to FIGURE 7 which shows the modulated pulse trains actually supplied to one of the SCR gates in accordance with the present invention.

The gate modulator and the gate driver for SCR 12 are identical to those described relative to SCR 13. Thus, a PNP transistor 61 is connected to transistor 54 in emitter-follower relationship, the primary of the pulse transformer 35 for SCR 12 being connected in the emitter circuit of such transistor 61. Resistor 62 corresponds to resistor 56, resistor 63 to resistor 58, and capacitor 64 to capacitor 59.

Figure 3:
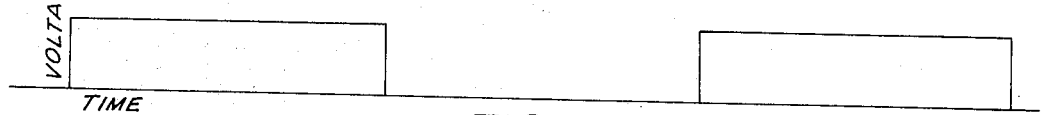
FIGURE 3 is a diagram showing the voltage supplied to one of the pulse-shaping networks of the present invention.
Figure 4:
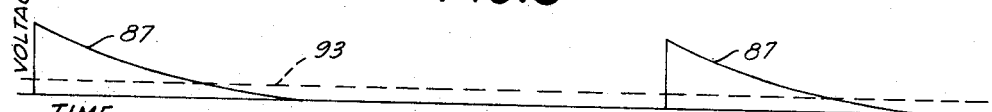
FIGURE 4 is a diagram illustrating the manner in which the voltage of FIGURE 3 is altered by the differentiating circuit portion of such pulse-shaping network.

Description of result which would occur if other types of gating, not incorporating the present invention, were employed If the present circuit were the same as the one described in said application Ser. No. 338,748, the previously-indicated modulating signals (which effect modulation of the high-frequency pulse train from oscillator 41) would be transmitted directly (through diodes) to the transistors 53 and 54 from a suitable flip-flop circuit. Such flip-flop would deliver, first to the emitter of transistor 53 and then to the emitter of transistor 54, a positive disabling signal sufficiently high to cut off such transistors. Each such disabling signal would be applied throughout a full one hundred-eighty degrees (half-cycle) of inverter operation, the result being that the high-frequency signal from oscillator 41 would be transmitted to the associated SCR during the entire remaining (alternate) half-cycle of inverter operation. Reference is made to FIGURES 3 and 4 of application Ser. No. 338,748.

The purpose of maintaining the gate drive signal for the full half-cycle (180 degrees) of inverter operation is to permit each SCR to retrigger at the proper moment, despite the varying power factor of the load. Such maintaining of the gate drive signal for the full half-cycle is conventional and has heretofore been regarded as necessary. This is stated, for example, on p. 154 of the General Electric SCR Manual, second edition.

Figure 2:
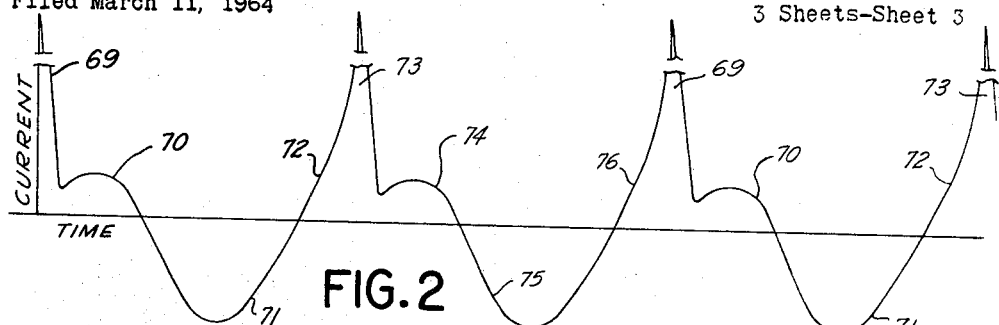
FIGURE 2 is a diagram illustrating the flow of current through the battery in the system described in the above-cited patent application, in the absence of the present invention.

FIGURE 2 of the present application illustrates a typical current wave, through the battery lead 22, which results when the gate drive is maintained for the full half-cycle. More specifically, FIGURE 2 illustrates such a current wave which results during charging of the battery 24 from line 10 as described in detail in application Ser. No. 337,621. During such charging, as will be mentioned hereinafter, there is a substantial phase difference between the voltage delivered by inverter 11 to transformer primary 20, and the voltage present in line 10. The phase difference is such that the inverter output voltage (across leads 18 and 19) lags behind the line voltage by a desired amount.

Referring first to the left-most portion of FIGURE 2, application of a first voltage pulse to the gate of one of the SCR's, for example SCR 13, triggers such SCR and immediately causes a commutating spike 69 to pass through the battery lead. This initiates the half-cycle of inverter operation. Such communicating spike is followed immediately by the remainder 70 of what may be termed the "primary pulse" through SCR 13. At the end of such primary pulse 69–70, current immediately commences to flow through the diode 15 associated with SCR 13, forming the "secondary pulse" 71 through such diode. The diode current, of course, flows in the opposite direction from the direction of current flow through the SCR, being on the opposite side of the horizontal axis. Because of the fact that the gate signal continues (in conventional circuitry) for the full half-cycle, the secondary pulse 71 through the diode 15 is followed immediately by a "tertiary pulse" 72 through SCR 13. Thus, as noted above, the presence of gate signal throughout the full half-cycle enables each SCR to re-trigger as soon as diode current ceases to flow. There are therefore two pulses through the same SCR 13, and one pulse through diode 15, during a single half-cycle of inverter operation.

Upon completion of the described half-cycle of inverter operation, the other SCR, number 12, is triggered to form a commutating spike 73 followed by the remainder 74 of the "primary pulse" through such SCR 12. Thereafter, a secondary pulse 75 flows through the diode 14 associated with SCR 12, following which a tertiary pulse 76 flows through SCR 12. The cycle then repeats, with the primary pulse 69–70, secondary pulse 71, and tertiary pulse 72 through the SCR 13 and its associated diode 15 as described heretofore.

It is implicit that no tertiary pulses 72 and 76 would be generated if the respective SCR's were not forward biased at that time. As will be set forth below, the present invention prevents the tertiary pulses 72 and 76 regardless of whether or not the SCR's are forward biased.

The tertiary current pulses 72 and 76 through the SCR's are extremely large when a relatively heavy charging current is being delivered to the battery 24 from line 10 as described in application Ser. No. 337,621, the degree of phase shift being substantial. Tertiary pulses may also exist under other conditions, as when the inverter is operating at no load. Furthermore, such tertiary pulses 72 and 76 (but normally of much lesser magnitude) may occur when the line 10 is dead and the inverter 11 is supplying standby power to a load (connected to the line 10) which is highly reactive in nature.

Discussion of certain critical features of the present method and apparatus

Applicant has discovered that the above-described tertiary current pulses 72 and 76 (FIGURE 2) are what create the above stated heating of the battery, commutating capacitor 16, etc. Stated in another manner, applicant has discovered that by going contrary to the prior art, and preventing re-triggering of each SCR during a single half-cycle, excessive heating of the battery and commutating capacitor are avoided. Applicant has also discovered that such elimination of the tertiary pulses 72 and 76 does not adversely affect the output of the system.

The curve portions 72 and 76 are relatively steep and rich in the higher-order harmonics. Because of the magnitudes of such curve portions 72 and 76, and because such curve portions are rich in high-frequency harmonics, they effect excessive heating of the battery with consequent out-gassing, shortened life, and other adverse effects indicated heretofore. Furthermore, because the tertiary pulses or curve portions 72 and 76 have such large magnitudes, the current flow incident to commutation is extremely large and produces excessive heating of the commutating capacitor 16. It will be understood that where a large current must be commutated, the size of the commutating capacitor 16 must be much greater than in situations where the current flow during commutating is relatively small.

The tertiary pulses 72 and 76 may be prevented (despite the presence of forward bias across the SCR's) by terminating the gate signals to the SCR's prior to the times represented by the junctions between curve portions 71–72, and 75–76. These points vary considerably in accordance with factors such as the rate of charging, or the nature of the load, but it is possible to terminate the gate signals sufficiently early to prevent re-triggering of the SCR's under all conditions of operation. Thus, for example, the gate signals may be terminated approximately 90 degrees subsequent to initiation thereof, this being in contrast to the 180 degree period conventional in the prior art. FIGURE 8 illustrates the resulting current curve through the battery lead 22. Portions of the curve shown in FIGURE 8 have been labeled correspondingly to FIGURE 2, except that the letter *a* has been added in each instance. It is to be noted that there are no tertiary pulses corresponding to pulses 72 and 76 of FIGURE 2.

Although the gate signals to SCR's 12 and 13 must be sufficiently short (discontinued sufficiently early) to prevent a second triggering of each SCR during a single half-cycle, they must be sufficiently long (continued throughout an adequate time period) to insure a first triggering thereof. For example, if the load is highly inductive the current will lag behind the inverter output voltage by a substantial phase angle. If only a single short pulse is applied to an SCR, there may be no forward bias present at such SCR at the time the pulse is applied, so that the SCR will not even trigger the first time. It is for this reason that the trigger signal should be applied to each SCR for a considerable interval of the half-cycle, for example 90 degrees as stated heretofore.

The time period during which the gate signal should be continued will vary widely, as noted above. Normally, however, the time period will be between about 40 degrees of inverter operation, and about 150 degrees of inverter operation. As previously pointed out, the gate signal may take numerous forms, including pulse trains, quasi square waves, and others.

It is emphasized that, as described in detail in said application Ser. No. 337,621, the current passing through the SCR's 12–13 represents discharging current flowing out of battery 24, whereas the current passing through the diodes 14–15 represents charging current into the battery 24. Thus, when the battery is being charged, as is the case relative to the prior-art current wave shown in FIGURE 2, the area between secondary pulse 71 and the horizontal axis must exceed the combined areas between primary and tertiary pulses 69–70 and 72 and such horizontal axis. The degree of such excess represents the net current flow into the battery. However, relative to FIGURE 8 which shows the current wave resulting from the present invention, the area of the secondary pulse 71*a* need only exceed the area of primary pulse 69*a*–70*a*. It will therefore be understood that the same net charging current in the battery is achieved, by the present invention, with a very much less current flow in both directions through the battery. This being the case, the losses in the system, and the degree of heating of the battery and other elements, are greatly reduced while still achieving the desired rate of battery charging. By analogy, it will be understood that if a 10-ampere net current flow into the battery is achieved by subtracting a 190-ampere SCR current from a 200-ampere diode current, the amount of heating will be greatly in excess of that which occurs if a 90-ampere SCR current is subtracted from a 100-ampere diode current.

It is pointed out that the area between curve portion 71*a* and the horizontal axis (FIGURE 8) is much smaller than the area between curve portion 71 and horizontal axis in FIGURE 2. This is because the diode current flow 71*a* does not need to compensate for the tertiary pulse 72, and for the losses generated by such pulse. Nevertheless, the rate of charging of the battery in the FIGURE 8 situation is the same as in the FIGURE 2 situation.

As previously indicated, the present invention is also beneficial in situations other than during charging of the battery in the present standby power system. For example, when an inverter which is not part of a standby power-supply system is operating at no load, relatively small tertiary pulses 72 and 76 may exist. It has been discovered that, by eliminating such tertiary pulses, circulating currents and heating are reduced without lowering the output of the inverter. Any energy output represented by the tertiary pulses 72 and 76 is compensated for, after such pulses are eliminated, by increases in the magnitudes or durations of primary pulses 70 and 74.

Description of remaining portions of the preferred circuitry for achieving the gating of the present invention Referring next to FIGURE 1A in particular, a phase-shifter and square-wave generator is indicated schematically at 78. Such circuit derives a signal from line 10, utilizes such signal to generate a square wave output, and automatically shifts the phase of such square-wave output in accordance with the desired degree of charge of battery 24. Thus, circuit 78 regulates the charging of the battery as described in detail in application Ser. No. 337,621. Stated more definitely, circuit 78 may include the sync generator, sync gate, sync amplifier, oscillator and flip-flop, and battery charge control described in application Ser. No. 337,621.

A sensing transformer 80, the primary of which is bridged across line 10, is employed to derive the indicated signal from the line and to supply such signal to the circuit 78. Furthermore, as described in detail in said application Ser. No. 337,621, a second sensing transformer 81 is employed to supply a second input to the circuit 78 in order to compare phases, on opposite sides of a line control circuit 82, prior to operation of such line control to closed-circuit condition. The line control serves to safeguard the present standby power-supply system against the effects of short circuiting of line 10, and performs other functions set forth in said application Ser. No. 337,621.

Circuit 78 has two output leads, numbered 83 and 84, each of which is supplied with a square-wave voltage during one half-cycle of inverter operation. For example, the square-wave signal supplied to output lead 83, for the full 180 degrees of inverter operation, is shown in FIGURE 3. The signal supplied to the second output lead 84 corresponds exactly to that shown in FIGURE 3, except that it is 180 degrees out of phase therewith. Both such signals or voltages are positive.

In the circuit described in application Ser. No. 338,-

748, such square wave voltages were supplied (through blocking diodes) to the transistors 53 and 54 and served to cut off such transistors during complete half-cycles of inverter operation. This resulted in the blocking of the high-frequency signal from oscillator 41 during complete half-cycles of inverter operation, as shown in FIGURES 2–4 of application Ser. No. 338,748, and as indicated earlier in this specification relative to the detailed description of FIGURE 1B in particular.

In accordance with the present invention, wherein gate signal is only applied to each SCR throughout much less than a full half-cycle of inverter operation, the leads 83 and 84 are connected to pulse shapers 85 and 86. The pulse shaper 85 is associated with transistor 53, whereas pulse shaper 86 is associated with transistor 54. The operation of pulse shaper 85, and associated circuitry, will next be described in detail, it being understood that pulse shaper 86 is identical thereto relative to both construction and operation.

Pulse shaper 85 includes a differentiating network adapted to differentiate the square-wave signal (FIGURE 3) from circuit 78 and convert the same to the shape indicated at 87 in FIGURE 4. Thus, a capacitor 88 is interposed in lead 83 and connected through a limiting resistor 89 with the base of an NPN transistor 90. A second resistor, numbered 91, is connected between negative lead 23 and the junction between the capacitor 88 and resistor 89. The emitter of transistor 90 is connected to negative or ground lead 23, whereas the collector of the transistor is connected through a resistor 92 to positive control lead 32.

Capacitor 88 and resistor 91 cooperate, in a manner well known in the art, to differentiate the square-wave signal as indicated above, whereas the resistor 89 operates to prevent the relatively low impedance of transistor 90 from shorting out the pulse and thus destroying the differentiating action achieved by elements 88 and 91.

The horizontal line 93, FIGURE 4, indicates the base saturation voltage level of transistor 90. As long as the magnitude of pulse 87 exceeds the value indicated by line 93, transistor 90 is in saturated condition. When the voltage of pulse 87 is lower than the value indicated by line 93, transistor 90 is no longer saturated and is finally (when the voltage of pulse 87 becomes sufficiently low) in cut-off condition.

In the absence of the pulse 87 (FIGURE 4), transistor 90 is in cut-off condition because there is no forward bias thereon, the bias-return path being only to the emitter. Because transistor 90 is cut off, the collector load 92 thereof places a forward bias on a diode 94 which is interposed in a lead 95 between the emitter of transistor 53 and the junction between resistor 92 and the collector of transistor 90. Thus, resistor 92 and the resistor 58 (in the gate modulator for SCR 13) form a voltage divider through which current flows from positive lead 32 to negative lead 23. The magnitudes of the resistors 92 and 58 in such divider are so selected that the voltage of the emitter of transistor 53 is sufficiently high to block transmission of pulses therethrough from high-frequency oscillator 41. Thus, it will be understood that in the absence of a sufficient signal 87 to the base of transistor 90, the associated transistor 53 blocks transmission of high-frequency signal to the SCR gate.

When transistor 90 becomes saturated due to the application of voltage pulse 87 (FIGURE 4), diode 94 becomes back biased (that is to say, does not have sufficient forward bias to conduct). Thus, current passes directly to ground lead 23 from the lower end of resistor 92, and no current passes through diode 94 into resistor 58. Since resistor 58 is no longer biased forwardly, there is no longer a positive voltage at the emitter of transistor 53, and such transistor will pass the gate signal.

Figure 5:
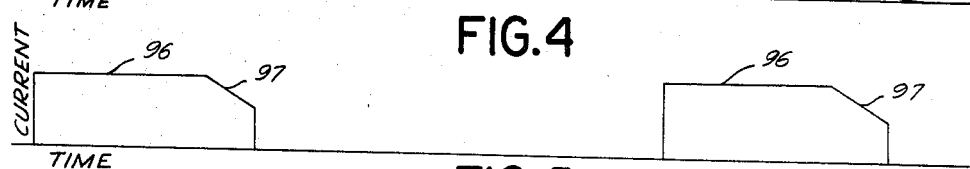
FIGURE 5 is a view illustrating the current flow through the transistor in one of the pulse-shaping networks.

The current flow through transistor 90, from resistor 92 to lead 23, is shown in FIGURE 5. The main portion of each current pulse is shown at 96, and occurs when transistor 90 is saturated. However, at the intersection of pulse 87 (FIGURE 4) and line 93, transistor 90 begins to cut off. The resulting progressively-decreasing current flow through transistor 90 is represented by the cut-off corner 97.

It will be understood that the decreasing bleed-current flow represented by corner 97 effects a progressive increase in the current flow through diode 94 and resistor 58 to ground. Thus, the emitter of transistor 53 then becomes progressively more positive, which causes the pulses from oscillator 41 to be progressively attenuated. The resulting gate signal passed through transistor 53 is shown in FIGURE 7, having a main portion 96a and a cut-off corner 97a. Of course, the gate signal is completely blocked by transistor 53 as soon as the magnitude of differentiated pulse 87 (FIGURE 4) becomes so low that transistor 90 cuts off.

By adjusting the relationship between resistor 92 and resistor 58, and other factors, the gate-modulator transistor 53 may be maintained in conduction for the above-specified time period adapted to trigger the associated SCR 13 once, and once only, during each half-cycle of inverter operation. Thus, the transistor 53 is caused to cut off prior to the junction between secondary pulse 71 and tertiary pulse 72 (FIGURE 2), so that the SCR 13 does not re-trigger The actual current curve resulting from application of the gate signal of FIGURE 7 is, as previously noted, illustrated in FIGURE 8.

As indicated above, there is a like gate signal relative to the SCR 12, this resulting from operation of the second pulse shaper 86 which is connected to the second output lead 84 of circuit 78. The components of circuit 86 have been designated correspondingly to those of circuit 85, except followed by the letter $a$ in each instance. Similarly, the diode associated with the second transistor 54 has been designated 94a.

It is to be understood that conduction of transistors 53 and 54 may be maintained beyond the described critical time, provided the pulses transmitted from oscillator 41 then have sufficiently low magnitudes that they will not effect triggering of the SCR's. In other words, if the pulses in corner portions 97a, FIGURE 7, have magnitudes insufficiently high to trigger the SCR's. it will be appreciated that such corners may lap over the critical times represented by the 71–72 and 75–76 junctions, FIGURE 2, without retriggering the SCR's.

Instead of employing the pulse shapers 85 and 86, it is possible to incorporate a monostable flip-flop or one-shot in each of the output leads 83 and 84 from circuit 78. The outputs of such flip-flops are connected, respectively, to diodes 94 and 94a. Each such flip-flop or one-shot is adjusted to conduct for approximately 270 dgerees or other desired time interval adapted to prevent formation of tertiary pulses 72 and 76. It is emphasized that if the flip-flop conducts for 270 degrees, it will block passage of high-frequency gate signal at all times except during a 90 degree interval. It is also emphasized that such circuitry is much more expensive than is the circuitry described herein relative to networks 85 and 86.

By way of example, capacitors 88 and 88a may each have magnitudes of 0.47 microfarads. Resistors 91–91a may be 4.7 kilohms; resistors 89–89a, 5.6 kilohms; resistors 92–92a, 1.8 kilohms; and resistors 58 and 63, 620 ohms. The magnitude of each square-wave signal from circuit 78 may be 13 volts. The transistors 90–90a, and 53–54, may each be a No. 2N1302.

Brief summary of the method, and of the operation of the described circuitry

Let it be assumed that switch 25 in the battery lead is closed, that line control 82 is closed, and that the entire circuit is in normal operating condition. It is pointed out that the apparatus and method for effecting starting and stopping of operation of the circuit are described and illustrated in application Ser. No. 338,748.

As described in detail in application Ser. No. 337,621, the circuit 78 drives the inverter 11 in frequency synchronism with the voltage wave in line 10. The circuit 78 also shifts the phase of the inverter output voltage, in relation to the line voltage wave, and as desired to charge battery 24. Thus, when it is desired to effect charging of the battery, the phase of the inverter output voltage is caused to lag substantially behind the line voltage. Because of factors including the presence of ferroresonant transformer 27, the phase difference may be maintained without creating undesired effects.

Particularly during time intervals when the degree of phase shift effected by circuit 78 is substantial, so that charging of the battery occurs as described in application Ser. No. 337,621, the tertiary current pulses 72 and 76 illustrated in FIGURE 2 (relative to current flow through the battery) would occur, with consequent excessive heating of the battery, commutating capacitor 16, etc., if the method of gating the SCR's 12 and 13 were such as to permit such tertiary pulses 72 and 76 to exist.

Instead, in accordance with the present invention, the gate signals delivered to the SCR's 12 and 13 are terminated prior to the times when current ceases to flow through diodes 14 and 15, which diode currents are represented by the negative portions of the curves of FIGURES 2 and 8. If follows that SCR's 12 and 13 do not trigger a second time during each half-cycle of inverter operation, so that no tertiary pulses exist. Accordingly, there is no excessive heating of the battery or commutating capacitor, and no decrease in the output of the system even during operation thereof to supply power in the event of failure of line 10.

If the operation of circuit 78 is such that the voltage across transformer primary 20 is substantially in phase with the line voltage wave present in line 10, the present invention is likewise effective to prevent flow of excessive circulating currents. This is true despite the fact that the tertiary pulses which would then exist, in the absence of the present invention, are relatively small in comparison to the pulses 72 and 76 shown in FIGURE 2. If the inverter is supplying standby power to a load which is highly reactive, the present invention is also important in preventing excessive circulating currents, with consequent heating and other adverse effects. The present invention is also important in assuring shut-off of the system and as described in application Ser. No. 338,748, again for the reasons that tertiary pulses are prevented from existing.

Let it next be assumed that the line control 82 is open (following a period of operation of the present standby system to supply a load connected to line 10), but that the requisite line voltage is present in line 10 on the input side of the line control 82. The first sensing transformer 80 thus derives a signal from the line, following which circuit 78 operates (as described in application Ser. No. 337,621) by means of the second sensing transformer 81 (which senses the phase of the inverter-derived voltage which is present on the output side of line control 82) to correlate the phases of the voltage waves on opposite sides of the line control. The line control 82 is then closed, so that the present standby system merely rides or floats on the line.

The circuit 78 also supplies square-wave outputs (one of which is shown in FIGURE 3) to the pulse shapers 85 and 86. Such networks supply voltages through leads 95 and 95a to transistors 53 and 54, such voltages serving to block at the desired times the high-frequency signal (FIGURE 6) generated by oscillator 41. The relationships are such that transistors 53 and 54 pass the high-frequency signal during time periods which are sufficiently short to prevent formation of tertiary pulses 72 and 76 (FIGURE 2), so that the current wave shown in FIGURE 8 exists in battery lead 22. Such current wave does not effect substantial heating of the battery or commutating capacitor, this being contrasted with the condition which would occur if the current wave shown in FIGURE 2 were to exist in the battery lead.

The generation of the gate signal for SCR 13 is shown and described in detail herein, particularly relative to the curves of FIGURES 3-7. It is to be understood that corresponding curves may be drawn for SCR 12, but that such curves are offset by a 180-degree phase angle relative to the curves of FIGURES 3-5 and 7.

The foregoing detailed description is to be clearly understood as given by way of illustration and example only, the spirit and scope of this invention being limited solely by the appended claims.

I claim:

1. Apparatus for driving the gates of an SCR inverter through which current is flowing in substantially out-of-phase relationship relative to the inverter voltage, which comprises:
   circuit means to apply to the gate of each of the SCR's in said inverter triggering voltage having a magnitude sufficient to trigger such SCR's,
   said circuit means effecting application of said triggering voltage for a time period sufficiently long to insure a first triggering of one of said SCR's during each half-cycle of inverter operation, but sufficiently short to prevent triggering of either of said SCR's a second time during any half-cycle of inverter operation regardless of the presence of forward bias at said SCR's.

2. The invention as claimed in claim 1, in which said time period is longer than the time required for about forty degrees of operation of said inverter, and shorter than the time required for about one-hundred fifty degrees of operation of said inverter.

3. An inverter which is particularly adapted to be connected to a circuit through which current is flowing in substantially out-of-phase relationship relative to the inverter voltage, which comprises:
   a parallel square-wave SCR inverter incorporating reactance diodes, and
   gate circuit means connected to the gates of the SCR's in said inverter,
   said gate circuit means applying to the gate of each of said SCR's triggering voltage having a magnitude sufficient to trigger such SCR,
   said gate circuit means effecting application of said triggering voltage for a time period sufficiently long to insure a first triggering of one of said SCR's during each half-cycle of inverter operation, but sufficiently short to prevent triggering of either of said SCR's a second time during any half-cycle of inverter operation despite continued SCR forward bias.

4. An inverter circuit, which comprises:
   a parallel square-wave SCR inverter incorporating first and second SCR's and first and second reactance diodes, an oscillator adapted to generate a train of pulses each of which is adapted to effect triggering of one of said SCR's,
   first and second gate-modulator transistors, circuit means to connect the output of said oscillator to the bases of said gate-modulator transistors, circuit means to connect the collector of said first gate-modulator transistor to the gate of said first SCR, circuit means to connect the collector of said second gate-modulator transistor to the gate of said second SCR, a square-wave generator having first and second outputs,
   said square-wave generator effecting transmission of a square-wave voltage pulse through each of said outputs during a full one-hundred eighty degrees of operation of said inverter,
   said voltage pulses transmitted through said outputs from said square-wave generator being one-hundred eighty degrees out-of-phase relative to each other, first and second differentiating circuits connected, respectively, to said first and second outputs of said square-wave generator to differentiate said square-wave voltage signals and form differentiated signals, first and second circuit means responsive to said differentiated signals to control, respectively, said first and second gate-modulator transistors in such manner that transmission of pulses from said oscillator to said SCR gates is blocked when said differentiated pulses have magnitudes in excess of predetermined values, said differentiating circuits being so constructed and related to the remainder of the circuit that said pulses from said oscillator are transmitted to said SCR gates for a time interval sufficiently long to trigger one of said gates a first time during each half-cycle of inverter operation, but sufficiently short to prevent triggering of either of said gates a second time during the half-cycle of inverter operation.

5. The invention as claimed in claim 4, in which said circuit means responsive to said differentiated signals each comprises a pulse-shaper transistor, the base of which is connected to the associated differentiating circuit, a resistor connected between the positive terminal of a voltage source and the collector of said pulse-shaper transistor, the emitter of said pulse-shaper transistor being connected to the negative terminal of said voltage source, in which a diode is connected between the emitter of the associated gate-modulator transistor and the junction between said resistor and said collector of said pulse-shaper transistor, the cathode of said diode being connected to said gate-modulator transistor emitter, and in which an additional resistor is connected between said emitter of said gate-modulator transistor and said negative terminal of said voltage source.

6. A method of driving the two SCR's in an SCR inverter which is connected to a circuit through which current is passing in substantially out-of-phase relationship relative to the inverter voltage, which method comprises:
applying triggering voltage to one of said SCR's to initiate a particular half-cycle of inverter operation,
discontinuing said triggering voltage at a time sufficiently early to prevent a second triggering of said one SCR during said particular half-cycle of inverter operation regardless of the presence of forward bias at said one SCR,
applying triggering voltage to the other of said SCR's to initiate the next half-cycle of inverter operation,
discontinuing said last-mentioned triggering voltage at a time sufficiently early to prevent a second triggering of said other SCR during said next half-cycle of inverter operation regardless of the presence of forward bias at said other SCR, and
repeating said steps to effect current flow through each of said SCR's once and once only during each half-cycle of inverter operation.

7. A method of driving the SCR's in an SCR inverter, which comprises:
providing a parallel square-wave SCR inverter incorporating two SCR's and two reactance diodes, connecting said inverter in circuit between a battery and a circuit through which current is passing in substantially out-of-phase relationship relative to the inverter voltage,
applying triggering voltage to one of said SCR's to initiate a particular half-cycle of inverter operation,
said one SCR thereafter ceasing to conduct due to said out-of-phase character of said current which then flows through the diode associated with said one SCR,
discontinuing said triggering voltage at a point in time which is sufficiently early to prevent a second triggering of said one SCR during said particular half-cycle of inverter operation,
applying triggering voltage to the other of said SCR's to initiate the next subsequent half-cycle of inverter operation,
said other of said SCR's thereafter ceasing to conduct due to said out-of-phase character of said current which then flows through the diode associated with said other of said SCR's.
discontinuing said last-mentioned triggering voltage at a point in time which is sufficiently early to prevent a second triggering of said other of said SCR's during said next subsequent half-cycle of inverter operation, and repeating said steps to effect current flow through each of said SCR's once and once only during each half-cycle of inverter operation.

8. A method of driving an SCR inverter which is connected to a highly reactive load, comprising:
triggering the SCR's in said inverter in such manner that each SCR conducts once and once only during each half-cycle of inverter operation regardless of the presence of forward bias at said SCR's.

9. A method of charging a storage battery from an A.C. power source, which method comprises:
connecting an SCR inverter incorporating reactance diodes between a storage battery and an A.C. power source, alternating supplying to the gates of the SCR's in said inverter trigger signals having durations sufficient to trigger one SCR once during each half-cycle of inverter operation but insufficient to effect a second triggering of an SCR during any half-cycle of inverter operation, synchronizing said trigger signals in frequency with the A.C. output voltage wave from said power source, and shifting the phase of said trigger signals relative to the phase of the output voltage wave from said power source until a net charging of said battery is achieved.

10. The invention as claimed in claim 9, in which said method includes supplying triggering voltage to each of said SCR's during a time period not less than that required for about forty degrees of inverter operation, and not more than that required for about one-hundred fifty degrees of inverter operation.

11. The invention as claimed in claim 9, in which said method includes connecting said inverter to said A.C. power source through a ferroresonant transformer.

12. A standby power-supply and battery-charging apparatus adapted to be associated with an A.C. power line through which an alternating voltage wave is normally passed, which comprises:
a parallel square-wave SCR inverter incorporating reactance diodes,
a ferroresonant transformer having an input connected to said inverter and an output adapted to be connected to said power line,
means to connect a storage battery to the input of said inverter whereby said inverter may operate to transmit power from said storage battery to said power line in the event of failure of said line,
circuit means to drive said inverter in frequency synchronism relative to said A.C. voltage wave in said line,
said circuit means including means to trigger one of the SCR's in said inverter once during each half-cycle of inverter operation and to discontinue such triggering sufficiently early to prevent firing of either SCR a second time during any half-cycle of inverter operation, and
means to retard the phase of the output of said inverter relative to the phase of said A.C. voltage wave in said line to thereby effect charging of said battery from said line,
said phase retardation tending to effect a second firing of each of said SCR's during each half-cycle of inverter operation,
said second firing being prevented by said discontinuing of said operation of said trigger means.

13. An inverter circuit which is particularly adapted to be associated with a reactive load, which comprises:
   an SCR inverter incorporating two SCR's,
      a square-wave generator,
         said square-wave generator having first and second outputs each of which supplies a square-wave voltage signal during a one-hundred eighty degree time interval,
         said square-wave voltage signals being one-hundred eighty degrees out of phase relative to each other,
   first and second differentiating circuits connected, respectively to said first and second outputs of said square-wave generator to differentiate said square-wave signals, and
   means responsive to the resulting differentiated square-wave signals to drive, respectively, the gates of said inverter SCR's,
      said differentiating circuits being so constructed and related that trigger signals are applied to said gates of said SCR's throughout time periods sufficiently long to effect triggering of one of said SCR's during each half-cycle of inverter operation, but sufficiently short to prevent triggering of either of said SCR's a second time during any half-cycle of inverter operation.

References Cited

UNITED STATES PATENTS

| | | | |
|---|---|---|---|
| 3,303,408 | 2/1967 | Prines | 321—45 |
| 1,951,482 | 3/1934 | Holden | 307—64 |
| 2,263,320 | 11/1941 | Trucksess | 307—64 |
| 3,075,136 | 1/1963 | Jones | 321—45 |
| 3,215,864 | 11/1965 | Doyle | 307—88 |
| 3,229,111 | 1/1966 | Schumacher | 307—64 |
| 3,248,634 | 4/1966 | Fudaley et al. | 331—113 |
| 3,264,548 | 8/1966 | King | 321—45 |

JOHN F. COUCH, *Primary Examiner.*

W. SHOOP, *Assistant Examiner.*